United States Patent

[11] 3,589,360

| [72] | Inventor | John C. Sinclair |
| | | Storm Lake, Iowa |
| [21] | Appl. No. | 824,446 |
| [22] | Filed | May 14, 1969 |
| | | Division of Ser. No. 612,557, Jan. 30, 1967, Pat. No. 3,466,742. |
| [45] | Patented | June 29, 1971 |
| [73] | Assignee | Iowa State University Research Foundation, Inc. |
| | | Ames, Iowa |

[54] ELECTRICAL CABLE FOR CHRONIC IMPLANTATION WITHIN A LIVING BODY
3 Claims, 5 Drawing Figs.

| [52] | U.S. Cl. | 128/2.05F |
| [51] | Int. Cl. | A61b 5/02 |
| [50] | Field of Search | 128/2, 2.05, 2.1, 404, 418 |

[56] References Cited
UNITED STATES PATENTS

| 2,796,863 | 6/1967 | Von Wittern | 128/2.05 |
| 3,075,515 | 1/1963 | Richards | 128/2.05 |
| 3,216,424 | 11/1965 | Chardack | 128/418 |
| 3,359,974 | 12/1967 | Khalil | 128/2.05 |

*Primary Examiner*—William E. Kamm
*Attorney*—Henderson & Strom

ABSTRACT: An electrical instrument for measuring blood velocity for chronic implantation in a living body is disclosed herein. The instrument comprises a probe, an electrical cable, and a skin connector. The cable comprises a pair of coiled and insulated platinum alloy wires covered by a flexible electrically insulated material innocuous to animal tissue. The probe comprises a miniature thermistor electrically connected between the common ends of the wires and is also covered with the same electrically insulated material.

PATENTED JUN29 1971

3,589,360

INVENTOR
JOHN C. SINCLAIR
BY
Henderson & Strom
ATTORNEY

ELECTRICAL CABLE FOR CHRONIC IMPLANTATION WITHIN A LIVING BODY

CROSS REFERENCE TO RELATED APPLICATIONS

This application is a division of applicants prior copending application, Ser. No. 612,557, filed on Jan. 30, 1967, now U.S. Pat. 3,466,742, issued Sept. 16, 1969 and entitled PROCESS OF FORMING AN ELECTRICAL CABLE FOR CHRONIC IMPLANTATION WITHIN A LIVING BODY.

BACKGROUND OF THE INVENTION

The invention relates to the field of flexible conduits or cables capable of transmitting electric current, said cables adapted for implantation in living tissues for measuring coronary blood flow.

Methods used to measure coronary blood flow include flowmeters of various kinds; the uptake and disappearance of nitrous oxide or radioactive tracers, cyclic movement of various foreign substances, and differential pressure recordings. The electromagnetic and ultrasonic flowmeters are the only ones deemed suitable at the present for chronic implantation. Both the latter flowmeters have been found to disturb the blood flow pattern; the electromagnetic flowmeter surrounding the blood vessel by insulating material, and with the pickup electrodes requiring electrostatic shielding due to stray capacitance.

The ultrasonic flowmeter is lightweight and simple but requires very complex electronic instrumentation.

Cables used for chronic implantation of these devices into living tissues were thoroughly checked with one manufactured under the Dow Corning Corp. name found to be good. However, other than being more expensive than applicant's cable, the Dow cable for example was not sufficiently resistive to the permeation thereof of moisture, nor did it completely obviate interference with body functions, both nonpermeation and noninterference being requirements of applicant's cables.

SUMMARY OF THE INVENTION

This invention relates generally to the electrical arts and more particularly to a blood flowmeter or electric stimulating device suitable for implantation within a living body.

The recent microminiaturization of electronic components has made it possible to chronically implant flow transducers within the animal body. Implanting a transducer inside an artery, however, requires that such a device be made so small and so compliant that it does not obstruct the blood circulation or significantly disturb laminar blood flow. It must also be made innocuous to the body tissues while being flex-resistant in order to endure the constant movement of the body organs.

Accordingly, it is an object of this invention to provide a blood flowmeter device capable of withstanding the above stated forces indefinitely.

It is another object of our invention to provide an electrical cable suitable for chronic implantation within a human body, said cable capable of placing a flow transducer withing the blood stream for measuring coronary blood flow.

It is yet another object of this invention to provide an electrical cable capable of carrying an electrical impulse to the muscle of the heart when connected to a "pacemaker."

Still another object of our invention is to develop a process for making a flowmeter device that is capable of carrying through the named objectives.

Another object of our invention is to provide a process for producing an electrical cable which will be permanently flex-resistant.

It is still another object of this invention to provide a flowmeter device which is economical to manufacture, extremely compact and functional in use, and simple but rugged in construction.

The foregoing and other objects, advantages and characterizing features of our invention will become clearly apparent from the ensuing detailed description taken in conjunction with the accompanying drawings.

DESCRIPTION OF THE PREFERRED EMBODIMENT

Figure 1:
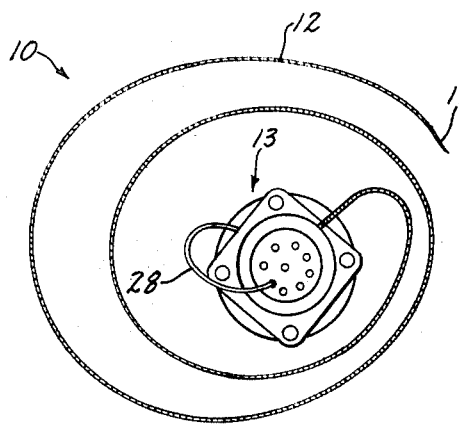
FIG. 1 is a plan view of our invention and showing the bottom of the skin connector.
Figure 2:
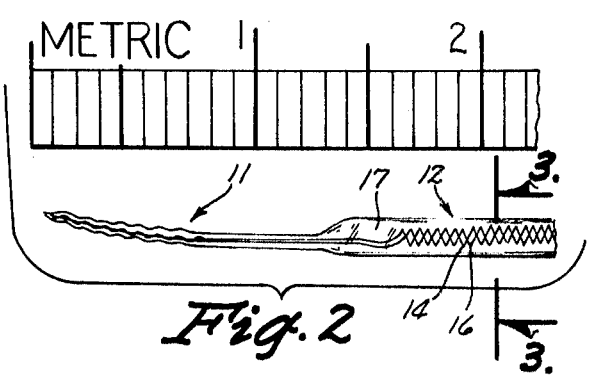
FIG. 2 is a greatly enlarged view of the probe and cable of this invention in relation to a metric ruler.

The thermistor flowmeter device as shown generally in FIG. 1 is composed of three parts. The probe 11 (FIG. 2) that is inserted into the artery, the cable 12 that acts as an electrical conduit, and the skin connector 13 that permits the device to be attached to an external recorder (not shown).

The cable 12 is made by coiling a double strand of platinum alloy wire, such as Platinum alloy wire 0851, 2.2 mil, class H insulation, Sigmund Cohn Corp., Mount Vernon, N.Y., into a coil about 1 mm. in diameter with commercially available apparatus of any known type. Two 5-foot length of wire are used for an 18-inch cable 12. The coils 14 and 16 are rinsed in isopropyl alcohol and blotted. They are then dipped in 4120 primer, such as Primer 0SS-4120, General Electric, Waterford, N.Y., and drained. The coils are suspended vertically in 3 mm. glass tubing which has been coated with silicone. A deaerated potting compound 17 (FIG. 2) is slowly injected or sucked into the tube with a syringe so as to avoid trapping bubbles. Silicone tubing, such as Vivosil, Medical grade, Becton, Dickinson and Company, Rutherford, N.J., is used with the syringe.

The potting compound 17 is allowed to solidify overnight and is then placed in the oven for thirty minutes. This and all subsequent heat treatments are done in an oven preheated to 135°C. If the glass tubing is previously coated inside with a thin film of potting compound 17, the cable can be cured immediately in a steam jacket or oven. One must use caution because the glass will shatter. The shattered glass is removed and the cable remaining is then rinsed in water. One end of the wires at one end of the cable 12 is straightened and dip-coated with varnish, such as Sylgard 01377, Dow Corning Corp. Midland, Mich., and then baked for two hours.

Figure 4:
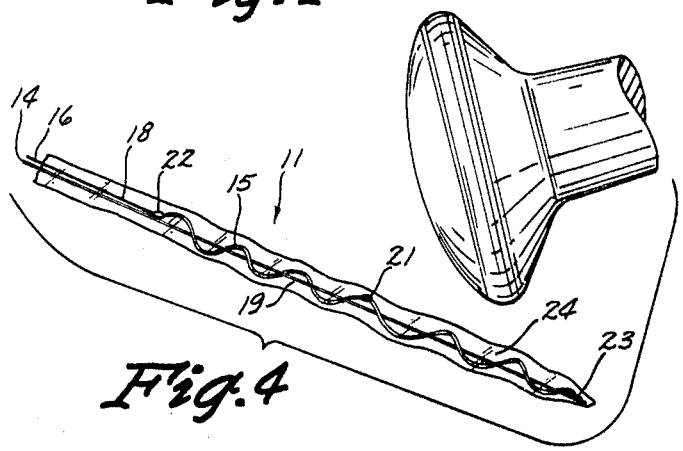
FIG. 4 is also an enlarged view showing the probe in relation to the head of an ordinary straight pin.
Figure 3:
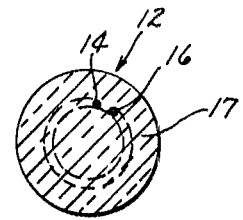
FIG. 3 is an enlarged cross-sectional view of the cable taken along the line 3—3 in FIG. 2.

To make the probe 11, the straightened wires are cut to 13 and 22 mm. lengths 18 and 19 (FIG. 4) respectively, stripped of insulation at the tips, and tinned with solder with the help of flux, such as Duzall, All-State Welding Alloys Co, Inc., White Plains, N.Y. The soldering is done with a drop of solder on the tip of a magnetic soldering iron of commercial availability. The solder is kept just above its melting point by adjusting the line voltage with a voltage regulator. The surface of the solder is cleansed with a thread before each use. These and all subsequent manipulations are accomplished under a disserting microscope.

The thermistor 21, such as Veco Micro-Bead 042A402C, Victory Engineering Corp., Springfield, N.J., has a lead wire 15 one end of which is joined to the end of the cable wire 18 by being wrapped several times thereabout, and with the joint 22 being tied by a suture strand. The joint 22 is then etched with flux and soldered, with the soldered joint etched with flux, cleaned with xylene, coated with varnish, and baked for 1 hour.

The cable wires 18 and 19 are tied together, also at joint 22, and then the thermistor lead wire 15 is wound around the longer cable wire 19, with the outer end thereof joined and tied to the outer end of wire 19 as at 23. The second joint 23 is then etched, cleaned, coated and baked as described relative to the first joint 22. Additional ties are made where necessary, with all ties made with a strand taken from a 2 cm. piece of Vetafil suture, a product of Dr. S. Jackson, Washington 11, D.C.

The entire probe tip 11 is then dipped in 4004 primer, such as Primer 0SS-4004, General Electric Waterford, N.Y., and baked for 15 minutes. The probe tip 11 is then dipped in a 50:50 mixture of dry xylene and Silastic, such as Medical adhesive 0891, Dow Corning Corp., Midland, Mich. The probe 11 is then air dried for 1 hour and baked for one additional hour. The probe 11 is then dip-coated with potting compound 24, identical to the compound 17, and baked for 30 minutes. The probe 11 is again coated with xylene and Silastic mixture, then again baked for 30 minutes.

Figure 5:
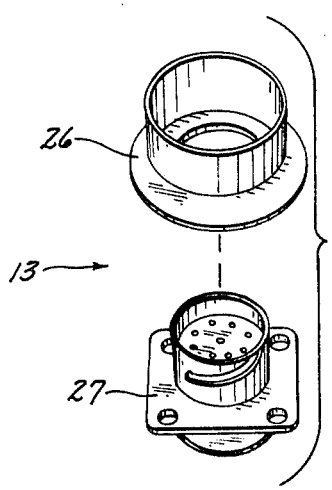
FIG. 5 is an exploded perspective view of the skin connector elements.

The skin connector 13 (FIGS. 1 and 5) is made by fitting a stainless steel flange 26 around a chassis connector 26 (FIG. 5). The cable 12 and a 5 cm. length of bare silver wire 28 are soldered to the connector 27. The silver wire 28 acts as a ground wire. The flange 26 and connector 27 base are then coated with a potting compound such as 17, and Silastic to waterproof and insulate the connector 13 as a unit.

The thermistor flowmeter device 10 is then ready for testing. It can be sterilized for surgery by placing it in the oven for 2 hours. and can also be chemically sterilized.

Calibration of the thermistor 21 is accomplished on a rotating drum (not shown) approximately 10 cm. in diameter. The thermistor probe tip 11 was rigidly held 3 mm. from the edge of the drum and about 12 mm. below the surface of the fluid. The fluid used was 20 percent sucrose by weight and 0.4 percent sodium chloride. The viscosity of this fluid at 25° C. is approximately that of blood plasma (1.7 centipoise). Changes in voltage across the recorder, such as Grass Polygraph, Model 5, Grass Instruments, Quincy, Mass., bridge circuit with changes in DC current at a constant flow rate were used to calculate $\Delta R/\Delta I$. The bridge circuit had 20 K ohm, 1 percent resistors in the base of each arm. The thermistor arm was balanced with a 25 K ohm potentiometer on the other arm. The current source was a 9-volt battery in parallel with a 50 K ohm potentiometer used as a gain control. The changes in voltage with changes in flow rate at forty $\mu A$ of current were used to calculate $\Delta R/\Delta F$. The voltage is a log function of the flow rate.

The insulation of the device was tested in the same fluid with a 1 volt square wave taken from the calibrating circuit of the oscilloscope, such as Oscilloscope 0502, Tektronix, Inc., Portland, Ore. A wire from the calibration jack was immersed in the fluid. If the square wave was picked up by the probe, it was rejected. The time constant was calculated from the rise time of one of the fast transients seen when the rotating drum is suddenly stopped. One such spike was considered to be one-half of an idealized sine wave.

It is known that a thermistor such as 21 is a semiconductor material with a large temperature coefficient. An increase in temperature greatly increases the density of current carriers and so lowers the resistance. Its total resistance as used here is a function of the nominal resistance, the current flowing through it, the temperature of the blood, and the velocity of blood flow. Forty $\mu a$ of current will raise the temperature of the 20 K ohm thermistor about 0.6° C. above body temperature. The resistance will drop about 3.9 percent for each 1° C. rise in temperature. A flow signal of 1 mv. represents an increase in resistance of about 50 ohms. The flow velocity determines how rapidly heat is removed from the surface of the thermistor, and thus how effectively the thermistor is cooled by the blood.

A flowmeter which lies inside the blood stream poses certain unique problems. It is more apt to disturb the flow it is supposed to measure, both by the heat it dissipates and by its physical size; it may be inactivated by blood clots or tissue overgrowth; and its response may be distorted by the pulsating blood flow.

It has been shown theoretically that at present, exact mathematical calculation of the forces exerted on a body immersed in a streaming fluid is impossible even the case of steady flow. In the range of high Reynold's numbers, friction must be considered, for the force exerted on the body is due to a thin boundary layer of fluid (Prandtl's theory). Within this layer, the velocity gradient perpendicular to the body surface is very high and is a function of the viscosity. The boundary layer is stable up to Reynold's numbers of about 900 (Reynold's number = velocity × radius × density/viscosity). In pulsatile flow the blood is nonhomogenous and Reynold's numbers vary from zero to several thousand. Under these conditions, the response of the thermistor will be unpredictable.

The thermistor flowmeter device 10 has certain advantages over other implantable flowmeters. It's response is an indication of instantaneous flow rates at the surface of the probe. There are no intervening tissue layers or averaging effects to mask or distort the flow signal. It uses simple circuitry and is free of ECG. or magnetic field artifacts. It can also record temperature gradients and so can be used as a measure of cardiac output by thermal dilution methods.

The probe 11 of the device 10 which is placed inside the artery must be so small, strong, and flexible that the use of a platinum alloy wire is mandatory. Considering this requirement, the fabrication of the device 10 and its reuse are facilitated by using this same wire for the cable 12. The diameter of the probe wire is chosen to withstand the manipulations of implantation. The compliance of the probe 11 in turn fixes the minimum compliance that can be tolerated in the cable 12. It is necessary for the maximum flexibility of the cable 12 to choose a wire coil that matches the compliance of the cured potting compound. The coil can be made more flexible by increasing the diameter of the coil, using a smaller wire, or by including more loops per unit length. It is usually desirable to keep the overall size of the cable 12 as small as possible. A cable 1 mm. in diameter is quite strong and can be made very flexible by the above considerations.

If one wishes to avoid the necessity of aligning the coils 14 and 16 inside the glass tubing, the inside of the tubing can be coated with a thin film of potting compound and cured before the wire coils are inserted. Alternatively, the cable 12 can be dip-coated with Silastic or potting compound after it is removed from the glass tubing. Any low viscosity silicone resin that is waterproof and is a good insulator can be used as a potting compound. A suture can be tied close to each end of the coils 14 and 16 to prevent the wire from pulling out of the cable 12 during the fabrication of the device. A few millimeters of braiding would serve the same purpose, but would hinder the reuse of the cable 12.

The most difficult part of the fabrication is the coating of the tip 11. Various materials (varnish, primers, Silastic, and potting compound) were tried in all conceivable combinations. It was learned that the potting compound 17 and the Silastic would bond to themselves and to one another, if the undercoat was properly primed and cured. The combination of materials finally adopted gives a probe 11 which is flexible and waterproof.

Four dogs and 13 pigs were implanted to learn what sort of probe design and technique of implantation were best. The connectors were attached to the skull with screws at first, but the neck flexing pulled the probes out of the artery. It was also difficult to maintain aseptic conditions when the cables were threaded under the skin to the skull. Septic conditions could rapidly destroy the silicone elastic cable. Insulated stainless steel wire was used in the beginning, but the cable lasted only a few days before breaks occurred in it. The coils of fine, insulated, platinum alloy wire embedded in silicone rubber were entirely satisfactory. Cables made in this way could be removed intact after several months in the animal. Several of the connector and cable assemblies were used over again after the thermistor probe was repaired.

The longest survival of a functional probe was 3 weeks. The device itself was intact but the intraarterial probe was partially walled off with endothelium. This 'walling-off' process can be well along after only one day, if the probe is digging or rubbing against the endothelium. Hence, the probe inside the artery needs to be relatively long and flexible, through this kind is very difficult to implant without damaging it. Suturing the probe base firmly to the wall of the artery helps to keep the probe from rubbing against the endothelium.

Several of the implanted tips 11 were found to have perforated the coronary artery twice. If the thermistor could be centered with a diagonal double perforation, so that the tip 11 protrudes from the underside of the artery this could be one way of staying in the center of the lumen. The motion of the heart during surgery, however, makes it impossible to achieve this. The field of view is also obstructed by the loss of blood during the time that the channeled needle is in place. Another way of centering the device is by placing flexible bristles on the tip of the probe 11 like the spokes of a wheel. These bristles would also tend to anchor the tip in place and help prevent it from pulling out during surgery. Centering would minimize any mechanical artifacts due to the motion of the heart and the arterial pulse. It would also retard an endothelial overgrowth of the tip 11 and would thus prolong its useful life. An electric zero flow could be determined by using a reference thermistor implanted near the spin where it would be shielded from mechanical motion and thermal gradients due to muscle contraction, respiration, or blood flow. Occluding the artery would not give a true zero flow.

The fabrication of a chronically implantable thermistor flowmeter device 10 has been described hereinbefore. It has an effective time constant of 0.02 second. It is suitable for the measurement of the intraarterial coronary blood flow transients in the quiet, unanesthetized pig. It consists of a probe 11 that projects into the lumen of the artery, a skin connector 13 for external recording, and a flexible silicon elastic cable 12 that acts as an electrical conduit. This device can remain intact in the animal body for several weeks but the probe 11 may become ensheathed with endothelium. The operative procedures are also very difficult. There are uncertainties relative to vasomotor changes at the site of implantation and to the position of the thermistor 21 within the velocity profile across the diameter of the vessel. Thus no knowledge of absolute flow rate is possible, but it should be proportional to the flow as it has been measured here. Hence, any conclusion drawn from these relative changes in blood flow should be valid.

Although a specific embodiment for making the thermistor flowmeter device of this invention has been described hereinbefore, the invention is to be limited only by the scope of the appended claims.

I claim:
1. A thermistor blood velocity flowmeter for animal implantation comprising:
   a cable formed from a double strand of coiled platinum alloy wire, said wires being covered by flexible electrically insulated material innocuous to the animal body tissue;
   a probe designed for insertion through the wall of a blood vessel formed from the common ends of said coiled wires and having a miniature thermistor responsive to temperature variance of said animal body electrically connected between said common ends of said wires, said probe being heatable above the temperature of the blood in which it is immersed and being covered by an electrically insulating body of material;
   external means for heating said thermistor above the temperature of the blood;
   and a skin connector electrically connected to said electrical cable, said skin connector being electrically connectable to an external recorder.

2. The thermistor flowmeter of claim 1 wherein said common ends of said coiled wires are substantially straight and have a length one approximately twice the other, and wherein said thermistor is secured to said common ends as by suture tied, soldered joints between the short end and the long end of said wires.

3. The thermistor flowmeter of claim 2 wherein said body of material comprises a 50–50 mixture of xylene and Silastic.